US011826906B2

(12) United States Patent
Wang (10) Patent No.: US 11,826,906 B2
(45) Date of Patent: Nov. 28, 2023

(54) METHOD FOR ELIMINATING MISJUDGMENT OF REFLECTIVE LIGHT AND OPTICAL SENSING SYSTEM

(71) Applicant: PIXART IMAGING INC., Hsin-Chu (TW)

(72) Inventor: Guo-Zhen Wang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 377 days.

(21) Appl. No.: 17/102,558

(22) Filed: Nov. 24, 2020

(65) Prior Publication Data

US 2022/0160202 A1    May 26, 2022

(51) Int. Cl.
*B25J 19/02* (2006.01)
*G01S 17/04* (2020.01)

(52) U.S. Cl.
CPC ............. *B25J 19/021* (2013.01); *G01S 17/04* (2020.01); *A47L 2201/04* (2013.01)

(58) Field of Classification Search
CPC ........ G01S 17/48; G01S 17/06; G01S 17/931; G01S 5/163; G01S 17/93; G01S 7/4813; G01S 7/4815; G01S 17/89; G01S 17/86; G01S 17/08; G01S 11/12; G01S 15/08; G01S 15/931; G01S 17/02; G01S 7/4804; G01S 7/481; G01S 17/42; G01S 17/46; G01S 17/66; G01S 17/88; G01S 1/16; G01S 17/04; G01S 17/875; G01S 17/894; G01S 17/933; G01S 19/42; G01S 7/497; B25J 11/0085; B25J 9/1664; B25J 9/1697; B25J 9/16; B25J 19/005; B25J 19/02; B25J 9/1679; B25J 9/162; B25J 9/1682;

(Continued)

(56) References Cited

U.S. PATENT DOCUMENTS

| 2018/0014709 A1* | 1/2018 | O'Brien | ............... G05D 1/0225 |
| 2018/0246518 A1* | 8/2018 | Vogel | .................. G05D 1/0234 |

(Continued)

FOREIGN PATENT DOCUMENTS

| CN | 101981437 A | * | 2/2011 | ............. G01N 21/01 |
| CN | 105361817 A | * | 3/2016 | ............... A47L 9/00 |

(Continued)

*Primary Examiner* — Michael P Stafira
(74) *Attorney, Agent, or Firm* — Li & Cai Intellectual Property (USA) Office (57) ABSTRACT

A method for eliminating misjudgment of a reflective light applied to an autonomous robot is provided. The autonomous robot includes a driving system and an optical sensing system that includes a light source and a light sensor. The light source emits a transverse linear light as detection light and the light sensor senses reflective light signals from an object that reflects the detection light. In the method, a frame image including the reflective light signals is captured by the light sensor, characteristics of the reflective light signals are analyzed, and the characteristics of the reflective light signals can be corrected based on the characteristics of previous reflective light signals stored in a memory of the autonomous robot in order to exclude abnormal information. The object can be confirmed based on the corrected characteristics of reflective light signals. The misjudgment caused by the abnormal information can therefore be eliminated.

11 Claims, 10 Drawing Sheets

(58) Field of Classification Search
CPC ........ B25J 11/008; B25J 5/007; B25J 9/1676;
B25J 13/08; B25J 5/005; B25J 5/00;
B25J 9/1612; B25J 9/00; B25J 11/00;
B25J 11/009; B25J 11/0095; B25J 19/00;
B25J 9/0003; B25J 9/1689; B25J 9/1674;
B25J 19/023; B25J 9/1694; B25J 9/1666;
B25J 9/163; B25J 9/1692; B25J 15/0052;
B25J 15/0408; B25J 15/0425; B25J
15/0441; B25J 15/0491; B25J 19/022;
B25J 9/1669; B25J 9/1684; B25J 13/006;
B25J 19/021; B25J 9/0009; B25J 9/161;
B25J 13/00; B25J 13/088; B25J 13/089;
B25J 19/04; B25J 13/003; B25J 13/086;
B25J 15/0014; B25J 18/00; B25J
19/0066; B25J 19/0075; B25J 5/02; A47L
2201/04; A47L 2201/06; A47L 11/4011;
A47L 9/2826; A47L 9/2805; A47L
9/2852; A47L 2201/022; A47L 2201/02;
A47L 9/2894; A47L 9/28; A47L 9/2842;
A47L 9/2857; A47L 9/2873; A47L 9/009;
A47L 9/19; A47L 11/24; A47L 9/2847;
A47L 11/4008; A47L 2201/024; A47L
11/4013; A47L 2201/00; A47L 9/2831;
A47L 11/4002; A47L 11/4061; A47L
11/40; A47L 9/0477; A47L 11/4041;
A47L 11/302; A47L 11/4025; A47L
11/4066; A47L 11/4088; A47L 11/4094;
A47L 9/281; A47L 9/2884; A47L 11/26;
A47L 11/4091; A47L 9/106; A47L
11/4005; A47L 11/4019; A47L 11/4069;
A47L 9/00; A47L 9/30; A47L 11/4044;
A47L 5/24; A47L 5/28; A47L 9/04; A47L
9/0488; A47L 9/2889; A47L 2201/028;
A47L 9/2836; A47L 11/4083; A47L
9/0461; A47L 2201/026; A47L 11/28;
A47L 9/0472; A47L 9/0686; A47L
9/1409; A47L 11/00; A47L 5/30; A47L
11/283; A47L 11/4038; A47L 11/4072;
A47L 9/0063; A47L 11/4036; A47L
11/4063; A47L 11/4077; A47L 11/282;
A47L 11/4052; A47L 7/0085; A47L
9/0494; A47L 9/1683; A47L 9/1691;
A47L 11/284; A47L 11/405; A47L 13/42;
A47L 9/2815

See application file for complete search history.

(56) References Cited

U.S. PATENT DOCUMENTS

| | | | | |
|---|---|---|---|---|
| 2019/0220025 | A1* | 7/2019 | Chen | G05D 1/0246 |
| 2019/0220033 | A1* | 7/2019 | Cho | G05D 1/0251 |
| 2020/0093342 | A1* | 3/2020 | Jeong | A47L 11/4002 |
| 2020/0170470 | A1* | 6/2020 | Liggett | A47L 11/4002 |
| 2020/0386873 | A1* | 12/2020 | Wang | G01S 17/36 |
| 2022/0163666 | A1* | 5/2022 | Wang | G01S 17/46 |

FOREIGN PATENT DOCUMENTS

| | | | | | |
|---|---|---|---|---|---|
| CN | 106239504 | A | * | 12/2016 | ......... B25J 11/0085 |
| CN | 107101589 | A | * | 8/2017 | |
| CN | 107305386 | A | * | 10/2017 | |
| CN | 107847098 | A | * | 3/2018 | ............. A47L 9/28 |
| CN | 210464466 | U | * | 5/2020 | |
| DE | 102016107900 | A1 | * | 11/2017 | |
| JP | 2020070121 | A | * | 5/2020 | |
| JP | WO2019116549 | A1 | * | 12/2020 | |
| KR | 20200114860 | A | * | 10/2020 | |
| WO | WO-2016045593 | A1 | * | 3/2016 | ............ A01D 34/00 |
| WO | WO-2020213955 | A1 | * | 10/2020 | ............ B25J 19/022 |

* cited by examiner

METHOD FOR ELIMINATING MISJUDGMENT OF REFLECTIVE LIGHT AND OPTICAL SENSING SYSTEM

FIELD OF THE DISCLOSURE

The present disclosure relates to a method for improving judgment made by an optical sensing system, and more particularly to a method for eliminating misjudgment of a reflective light sensed by the optical sensing system.

BACKGROUND OF THE DISCLOSURE

The most common product of an autonomous robot in the market is a robot cleaner that can automatically clean the floor of a house without being manually operated by a user. A conventional autonomous robot may include a sensor for detecting obstacles on the floor of the house and can plan a route by robotics technology in order to navigate around the house.

When the autonomous robot automatically navigates in an area, one of the most important tasks is to avoid obstacles on its navigation path. Various conventional sensors can be used in the autonomous robot for detecting the obstacles. For example, a light sensor can be used to detect the obstacles by sensing detection lights emitted by a light source when the detection light is reflected by the obstacle on the navigation path.

However, misjudgments may still occur to the autonomous robot since the light sensor may be confused when receiving lights reflected by a highly-reflective wall or floor. The lights reflected by the highly-reflective object may generate signals that are too strong, which result in a misjudgment and a false alarm. For example, the erroneous signals generated by the highly reflected lights may cause the autonomous robot to calculate an inaccurate distance or generate a false report from an inconspicuous object, since a conventional algorithm running in the autonomous robot only relies on a center of gravity of the reflected lights to make the determination.

SUMMARY OF THE DISCLOSURE

In response to the above-referenced technical inadequacies, the present disclosure provides a method for eliminating misjudgment of a reflective light and an optical sensing system.

For solving the problem that an autonomous robot may obtain inaccurate analysis result that is calculated by a conventional algorithm based on the highly reflected lights sensed by the light sensor, a method for eliminating misjudgment of a reflective light, an optical sensing system and an autonomous robot that perform the method are provided in the present disclosure.

In an aspect of the disclosure, the method for eliminating misjudgment of reflective light is performed by a processor of an optical sensing system which can be installed in the autonomous robot. In the method, a series of frame images including reflective light signals are captured by a light sensor, and the reflective light signals are analyzed for obtaining characteristics of current reflective light signals. Erroneous information may be determined based on the characteristics of current reflective light signals. The characteristics of current reflective light signals are necessarily corrected based on the characteristics of previous reflective light signals, in order to exclude the erroneous information. Afterwards, an object that reflects a detection light emitted by the light source can be detected. The object causing the reflective light signals to be formed according to the corrected characteristics of current reflective light signals is confirmed when the misjudgment caused by the erroneous information is eliminated.

Preferably, the detection light emitted by the light source can be a transverse linear light and the reflective light signals sensed by the light sensor therefore form one or more transverse reflective lights.

In the method, in one aspect of the disclosure, the strengths, which can be understood as a confidence level value according to the method of the disclosure, of the transverse reflective lights can be calculated so as to exclude the transverse reflective light having a strength, i.e., a confidence level value, lower than a threshold.

Furthermore, the characteristics of the current or previous reflective light signals are represented by one or more centers of gravity that are calculated based on the one or more transverse reflective lights.

According to one further embodiment of the disclosure, when an object is detected according to the characteristics of reflective light signals that are formed by analyzing the reflective light signals, the method determines whether or not the strength of any light signal around the object exceeds a threshold in the frame image. The object can be confirmed its presence if the strength of the signals found around the object does not exceed the threshold. On the contrary, the object may be excluded if the strength of the signals around the object exceeds the threshold so as to eliminate misjudgment caused by an abnormal reflection from the object.

The present disclosure is related to the autonomous robot that implements the method for eliminating misjudgment of reflective light, and the autonomous robot includes a driving system that drives the autonomous robot to move, and the optical sensing system.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is related to an optical sensing system installed in the autonomous robot, and a method for eliminating misjudgment caused by any erroneous information or an object detected through the reflective lights that are sensed by an autonomous robot. According to the concept of the technology of the disclosure, the misjudgment can be eliminated when an image-processing procedure operated in the autonomous robot refers to the information of previous reflective lights while analyzing the current reflective light signals, which can be images taken by a camera. Especially in a highly reflective environment, the characteristics of the previous reflective lights effectively assist the optical sensing system of the autonomous robot to avoid misjudgment when the autonomous robot receives both interference information and current reflective lights at the same time.

Figure 1:
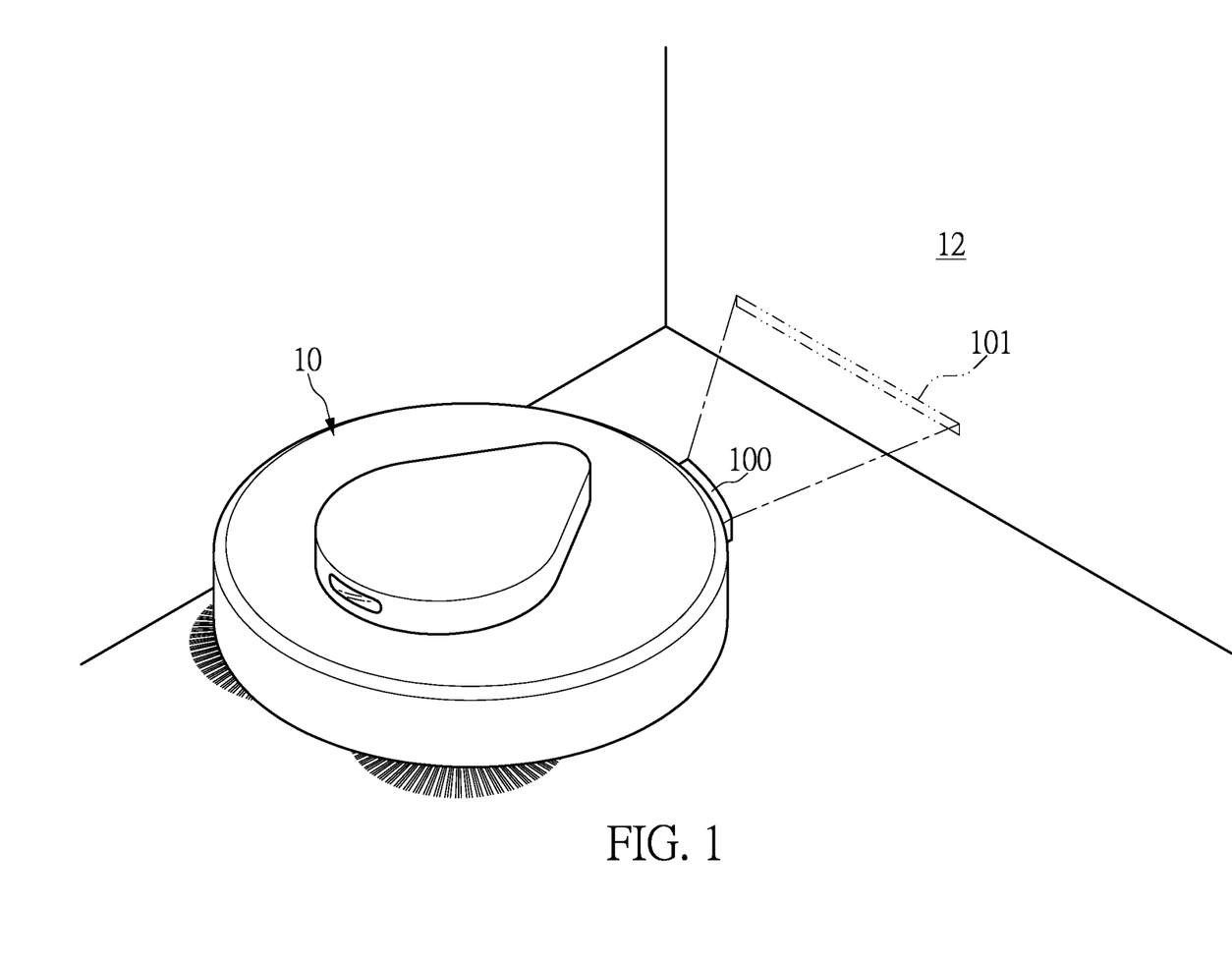
FIG. 1 is a schematic diagram depicting an autonomous robot emitting a transverse linear light to detect any object ahead of the autonomous robot according to one embodiment of the disclosure.

FIG. 1 is a schematic diagram depicting an autonomous robot emitting a transverse linear light to detect any object ahead of the robot according to one embodiment of the disclosure.

An autonomous robot 10 shown in the diagram is such as a cleaning machine, i.e., a robotic vacuum cleaning device, which uses a light source (in a light sensor module 100) to emit a detection light in a traveling direction ahead of the autonomous robot 10. As shown in the diagram, the detection light emitted by the light sensor module 100 is a transverse linear light 101 being projected onto a wall 12. The light sensor module 100 includes a light sensor that is used to receive the lights reflected by the wall 12. In an aspect, after analyzing the received lights when approaching the wall 12 or any object, the autonomous robot 10 will be driven to make a detour in order to avoid colliding with the wall 12 or any obstacle.

Figure 2:
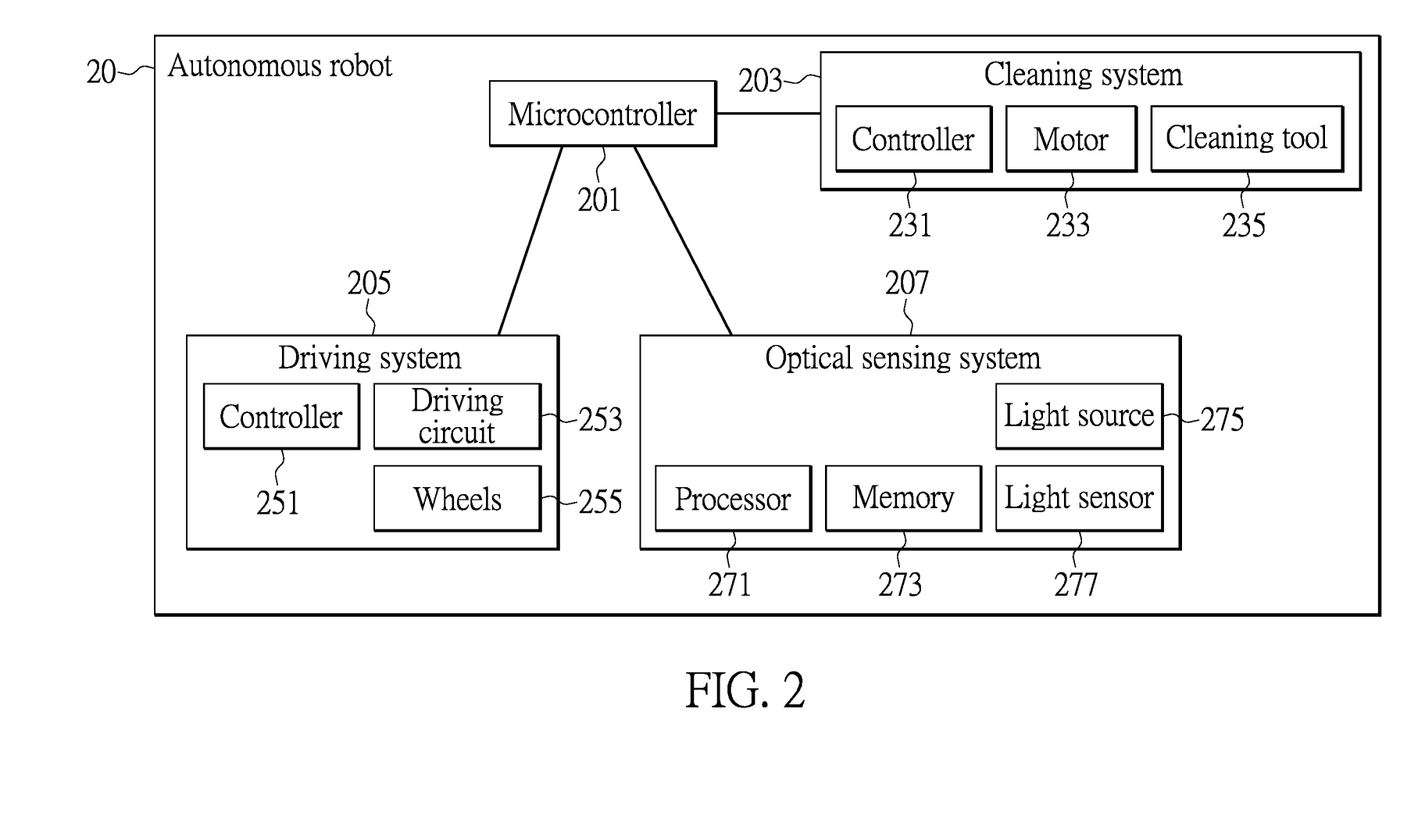
FIG. 2 is a block diagram depicting main circuits of the autonomous robot according to one embodiment of the disclosure.

FIG. 2 shows a block diagram that depicts main circuits of the autonomous robot according to one embodiment of the disclosure.

An autonomous robot 20 is shown in the diagram. The autonomous robot 20 has a microcontroller 201 that is electrically connected to other circuit systems for operating the functions of the autonomous robot 20. The autonomous robot 20 includes a driving system 205. The driving system 205 includes a controller 251 that controls a driving circuit 253 to drive the autonomous robot 20 to move through using wheels 255, e.g., a kind of omni-directional wheels.

The autonomous robot 20 can be a wheeled automatic robot that can itself move around an area and intelligently avoid obstacles ahead of it. For example, the autonomous robot 20 includes an optical sensing system 207 that is generally used to perform obstacle detection in the traveling direction of the autonomous robot 20. According to one embodiment of the disclosure, the optical sensing system 207 includes a processor 271, a memory 273, a light source 275 and a light sensor 277. While the autonomous robot 20 is in operation, the light source 275 continuously emits a transverse linear light as the detection light and the light sensor 277 then senses reflective light signals that are generated when any object reflects the detection light. In an aspect of the disclosure, one or more transverse reflective lights are formed when any object reflects the transverse linear lights.

When the autonomous robot 20 moves, the microcontroller 201 continuously receives detection results provided by the optical sensing system 207 and accordingly instructs the driving system 205 to operate. For example, the controller 251 of the driving system 205 controls the driving circuit 253 to drive the autonomous robot 20 to navigate the area based on a planned course until the autonomous robot 20 meets any obstacle. When the detection result shows the obstacle, the controller 251 of the driving system 205 accordingly controls the driving circuit 253 to avoid the obstacle.

In an exemplary example, the autonomous robot 20 can be a cleaning machine having a cleaning system 203. The cleaning system 203 includes a controller 231 that is used to control a motor 233 to drive the autonomous robot 20 to clean via a set of cleaning assembly, i.e., the cleaning tool 235. The autonomous robot 20 generally navigates the area for cleaning and is able to avoid the obstacles according to the information provided by the optical sensing system 207.

Figure 3:
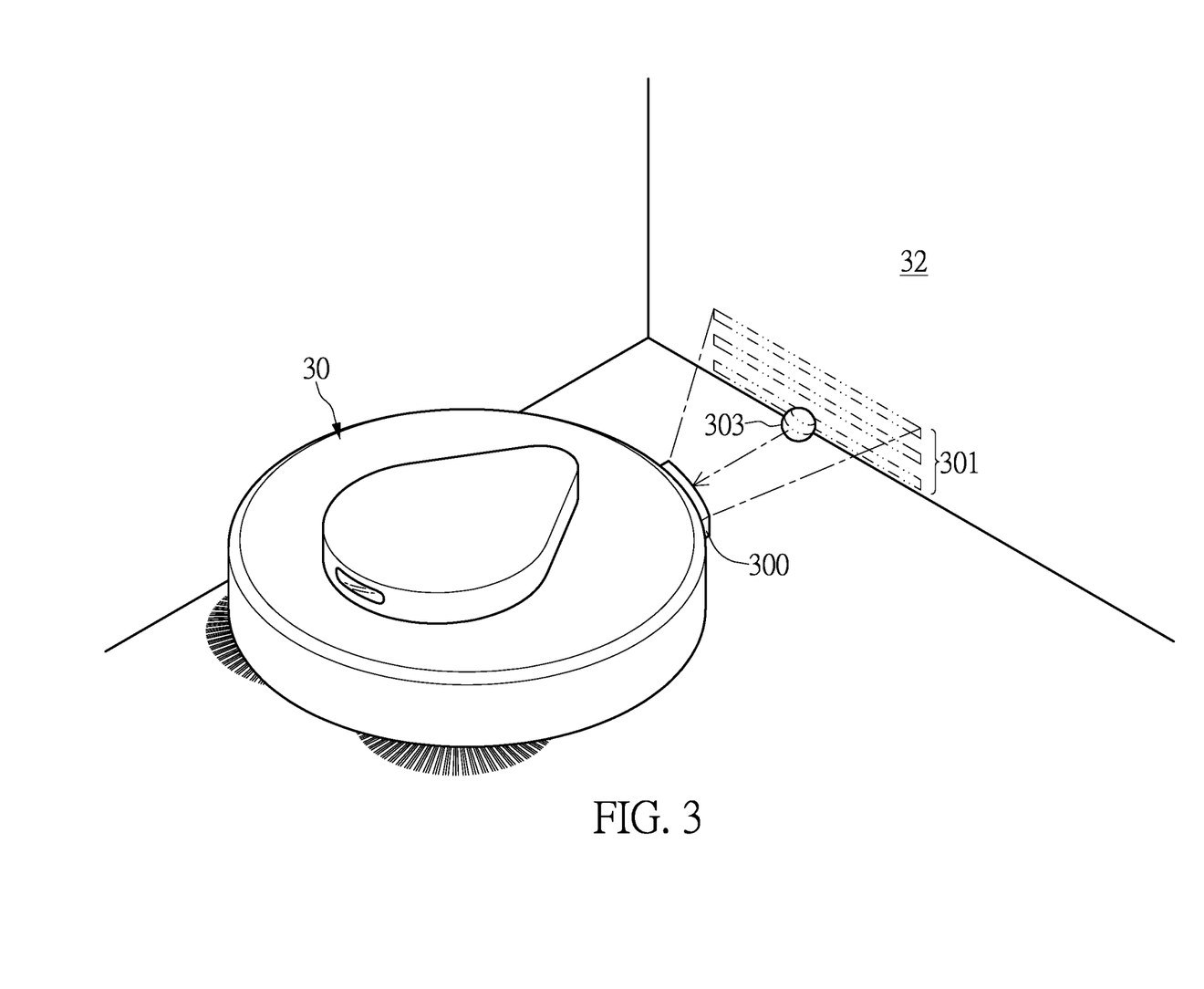
FIG. 3 is a schematic diagram depicting an autonomous robot emitting transverse linear lights to detect an object ahead of the autonomous robot according to one embodiment of the disclosure.

Reference is made to FIG. 3, which is a schematic diagram depicting an autonomous robot emitting transverse linear lights to detect an object ahead according to one embodiment of the disclosure.

An autonomous robot 30 shown in the diagram exemplarily emits a transverse linear light 301 that may include one or more detection lights to be projected onto a wall 32. The optical sensing system of the autonomous robot 30 continuously emits the transverse linear light 301 and captures reflective lights reflected by the ground or the wall 32. An image-processing procedure operated in the optical sensing system is used to analyze the characteristics of the reflective lights continuously when the autonomous robot 30 is in operation. Characteristics of reflective light signals can be stored in a memory, e.g., the memory 273 of the optical sensing system 207 of FIG. 2.

In the current example, when the autonomous robot 30 approaches the wall 32, the light sensor (in a light sensor module 300) of the optical sensing system senses the reflective lights from the wall 32 while the wall 32 reflects the transverse linear light 301. The reflective lights sensed by the light sensor then form reflective light signals which are configured to be analyzed. The autonomous robot 30 can timely avoid colliding with the wall 32 when the optical sensing system generates the detection result that allows the autonomous robot 30 to acknowledge information about the wall 32 in advance. The information received by the driving system of the autonomous robot 30 may include a direction, a distance and a size of any object, e.g., the wall 32, in a traveling path ahead of the autonomous robot 30.

As the diagram shows, an object 303 in front of the autonomous robot 30 is also sensed by the optical sensing system through the detection lights. When the autonomous robot 30 approaches the object 303, the light sensor can sense the object 303 by receiving the reflective lights since the object 303 reflects the detection lights. However, the presence of the object 303 should be confirmed, exemplarily including its shape or location, through more rigorous analysis by the optical sensing system in order to eliminate misjudgment.

In general, the optical sensing system relies on the reflective lights to determine if there is any obstacle in front of the autonomous robot. If any obstacle is found, the image-processing procedure operated in the optical sensing system can then determines a size of the obstacle and also a distance between the obstacle and the autonomous robot. Therefore, the autonomous robot can determine whether or not to avoid the obstacle. The autonomous robot may plan a new traveling path through a robotic algorithm if it is necessary to attempt to avoid the obstacle.

However, in some cases, the autonomous robot may make misjudgment due to the fault of the optical sensing system. For example, in one of the conditions, if the reflective lights are accompanied with other interferences, the optical sensing system cannot calculate the distance correctly and the optical sensing system then makes a misjudgment since it only relies on the reflective lights to make the judgment.

Figure 4A:
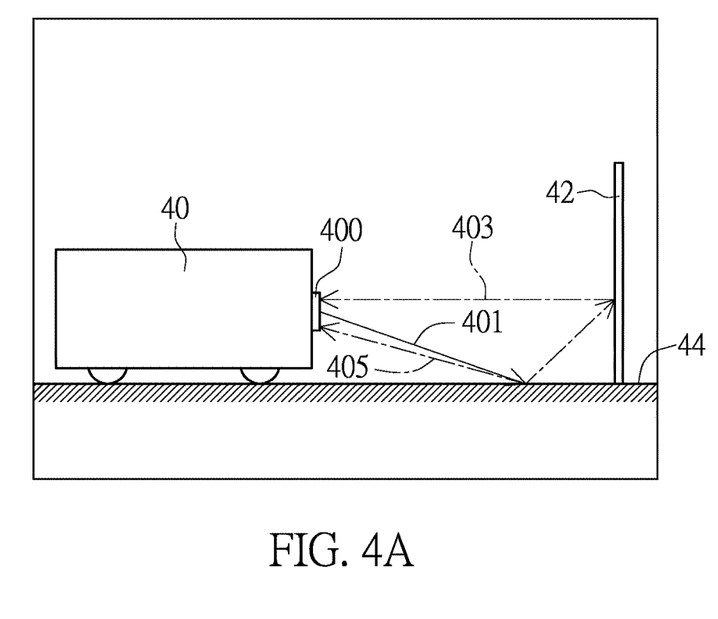
FIG. 4A is a schematic diagram depicting a detection light emitted by an autonomous robot and reflective lights sensed by the autonomous robot in one embodiment of the disclosure.

Reference is made to FIG. 4A, which shows a schematic diagram depicting an autonomous robot 40 that emits transverse linear light 401 as the detection light from a light sensor module 400.

As the diagram shows, when the transverse linear light 401 reaches a floor 44, the floor 44 reflects the transverse linear light 401 to the wall 42 and generates a first reflective light 403 back to the light sensor module 400. On the other hand, the floor 44 may also reflect the transverse linear light 401 to form a second reflective light 405 back to the light sensor module 400 directly. It should be noted that the second reflective light 405 may still be strong if the floor 44 is a highly reflective surface that may be made of a high-reflectivity material.

Figure 4B:
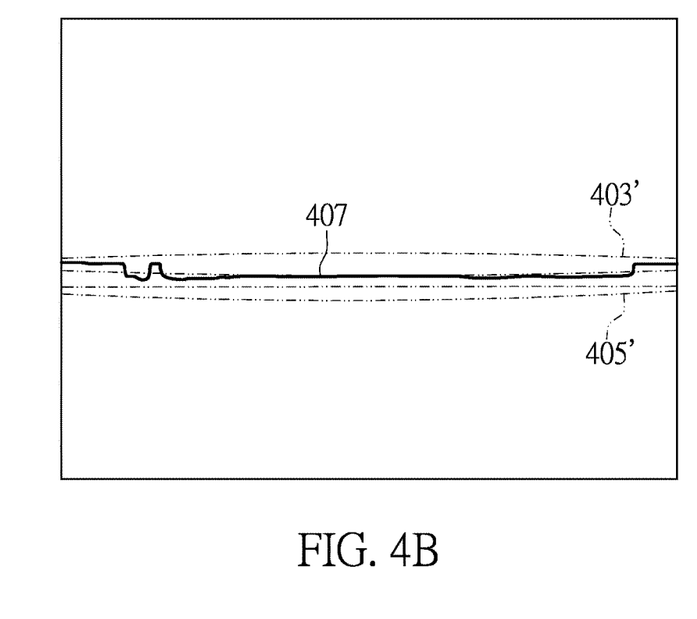
FIG. 4B is a schematic diagram showing an image including reflective lights and a line of gravity rendered by the autonomous robot in one embodiment of the disclosure.

Accordingly, the light sensor module 400 receives both the first reflective light 403 and the second reflective light 405 at the same time. Reference is made to FIG. 4B, which is a schematic diagram showing an image to be captured by the light sensor, and the image includes a first reflective light image 403' rendered by the above-mentioned first reflective light 403 and a second reflective light image 405' from the second reflective light 405. In the image, a line of gravity 407 is also shown.

The line of gravity 407 shown in the image is generally rendered by a process running in the autonomous robot according to reflective light signals sensed by the light sensor. In an aspect of the disclosure, the line of gravity shown is composed of consecutive centers of gravity over the reflective light image. For example, each of the centers of gravity is a point having a weight that is evenly dispersed over a certain range of the reflective light signals. Therefore, the center of gravity can indicate characteristics of the certain range of image, and the characteristics of the reflective light signals can be represented by a center of gravity that is calculated based on the transverse reflective lights.

The line of gravity 407 can be used to indicate the characteristics of the reflective light image.

In the present embodiment, the line of gravity 407 is used as an important reference for determining a distance from the autonomous robot to the object that reflects the transverse linear light 401. For example, the previous line of gravity of center of gravity stored in the memory is referred to for determining a current line of gravity or center of gravity that is configured to be stored in the memory. Afterwards, the line of gravity or the center of gravity is provided for the optical sensing system to calculate the distance from the autonomous robot to the object.

However, if two or more peaks are found from a raw image, it is difficult to determine the correct distance, thereby providing low confidence when making a determination based on the image. Therefore, when the image includes two or more reflective light images, i.e., the first reflective light image 403' and the second reflective light image 405', the distance will be calculated incorrectly due to the inaccurate line of gravity 407. The inaccurate distance will then result in misjudgment of the autonomous robot 40. If the current reflective light signals included in the image are determined to have two or more centers of gravity, the current reflective light signals are defined as erroneous information. In fact, the center of gravity will be regarded as the erroneous information when the related reflective light signals are formed by an unexpected reflective light from a ground or a wall.

In another condition, if the reflective lights are accompanied with other interferences, i.e., an erroneous reflective light, the optical sensing system may incorrectly determine the obstacle and then result in misjudgment.

Figure 5A:
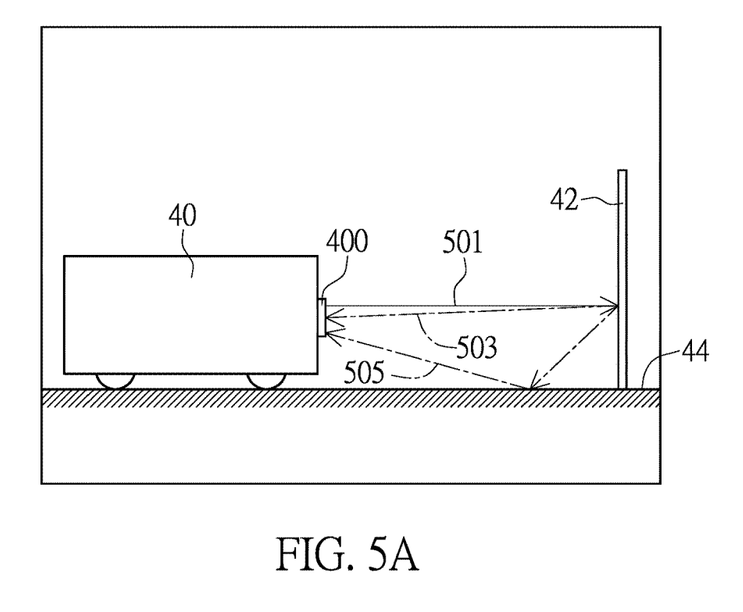
FIG. 5A is another schematic diagram depicting a detection light emitted by the autonomous robot and reflective lights sensed by the autonomous robot in another embodiment of the disclosure.

Reference is made to FIG. 5A, which shows another schematic diagram of the autonomous robot that emits the transverse linear light and receives more than one reflective light.

In the diagram, the autonomous robot 40 emits the transverse linear light 501 as the detection light when approaching the wall 42. When the transverse linear light 501 reaches the wall 42, the wall 42 reflects the transverse linear light 501, which forms a first reflective light 503 that is reflected back to the light sensor module 400. On the other hand, when the wall 42 reflects the transverse linear light 501 and the reflected light reaches the floor 44, the floor 44 reflects the light so as to form the second reflective light 505 that is received by the light sensor module 400 of the autonomous robot 40. Therefore, the optical sensing system of the autonomous robot 40 receives both the first reflective light 503 and the second reflective light 505 at the same time.

Figure 5B:
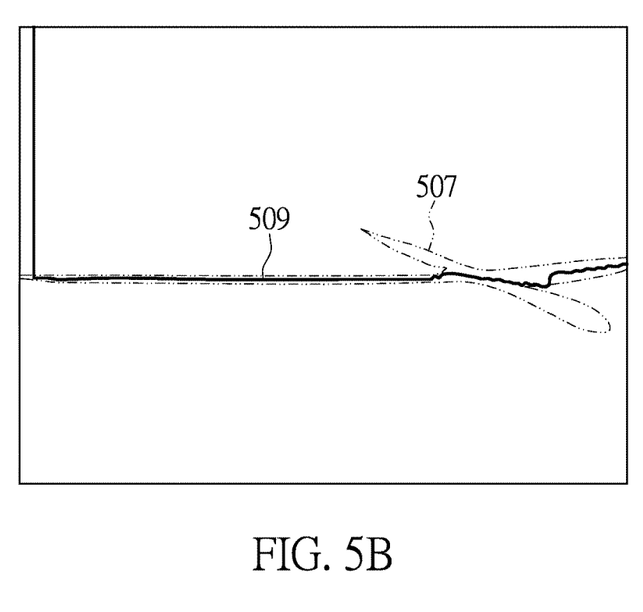
FIG. 5B is a schematic diagram depicting an image including reflective lights and a line of gravity rendered by the autonomous robot in one further embodiment of the disclosure.

FIG. 5B is one further schematic diagram depicting a reflective light image 507 that is composed of the above first reflective light 503 and second reflective light 505, and a line of gravity 509 being rendered by the autonomous robot.

Figure 5C:
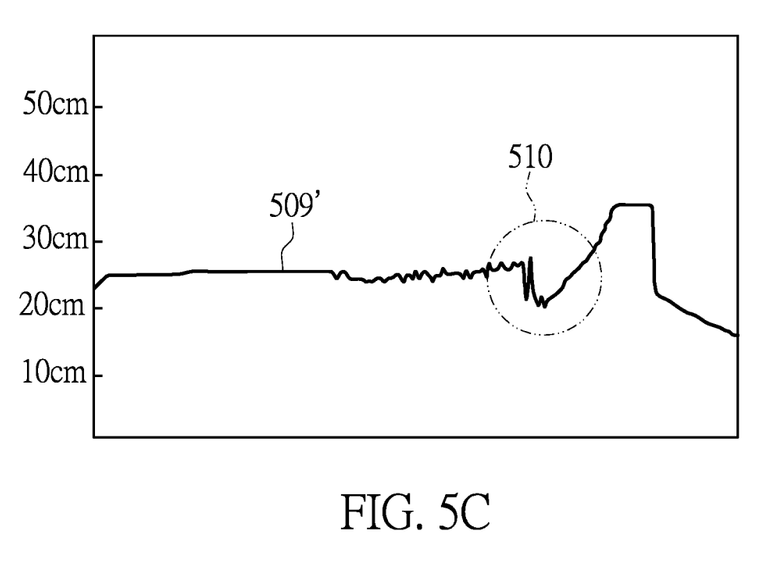
FIG. 5C is a schematic diagram depicting the line of gravity that is used to determine if any object is detected in one embodiment of the disclosure.

When the line of gravity 509 is redrawn as the line of gravity 509' shown in FIG. 5C, a peak 510 appears over the line of gravity 509'. The peak 510 may indicate that there is an object that reflects the transverse linear light 501. However, the object may be determined incorrectly since the determination is based on more than one reflective light, and the reflective lights may cause other strong signals that are from around the object to be detected.

Accordingly, the misjudgments may occur in the autonomous robot when the autonomous robot receives more than one reflective light at a time. For example, if the autonomous robot approaches the highly reflective surface, the autonomous robot gets a low confidence level to make determination, e.g., determining the distance and the obstacle, when more than one reflective light are received at the same time. It should be noted that a confidence level value can be defined for indicating how much the autonomous robot can trust the determination. For improving the above-mentioned technical inadequacies, the method for eliminating misjudgment of the reflective light of the present disclosure is provided. The method herein can be exemplarily a software-based solution that is performed by the processor of the optical sensing system of the autonomous robot.

Figure 9:
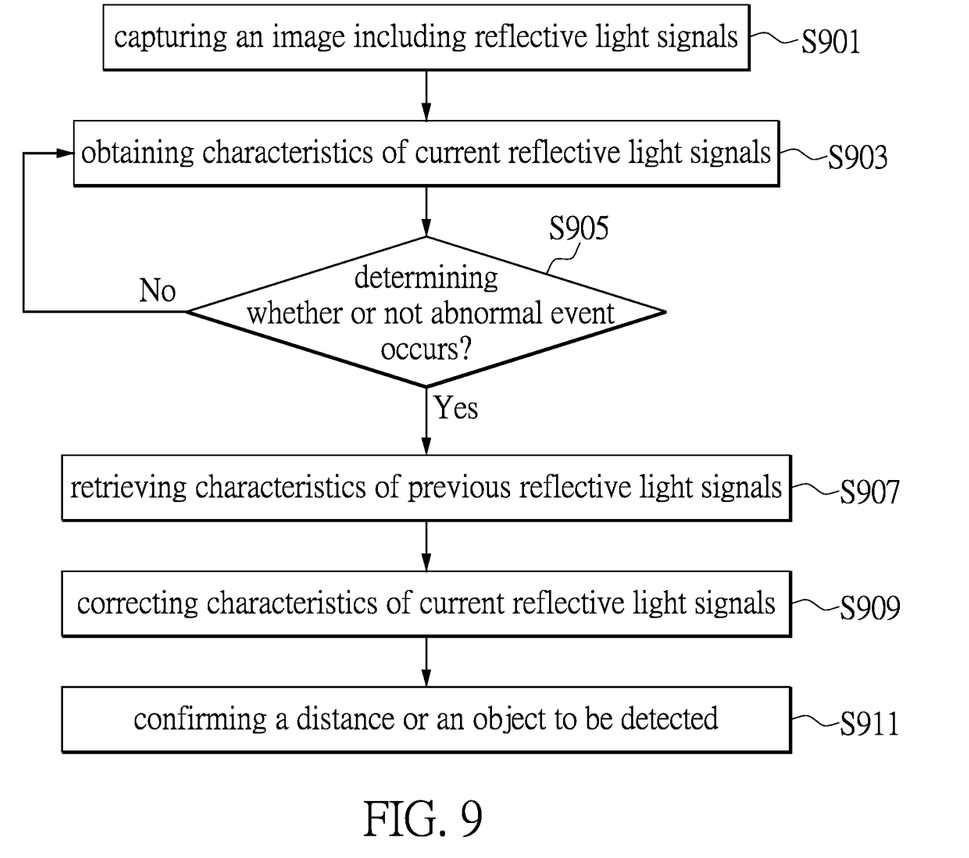
FIG. 9 shows a flow chart describing a method for eliminating misjudgment of a reflective light according to one embodiment of the disclosure.

Reference is made to FIG. 9, which shows a flow chart describing the method for eliminating misjudgment of reflective light according to one embodiment of the disclosure.

When the autonomous robot is in operation, such as in step S901, the light source continuously emits transverse linear lights and the images are continuously generated when the light sensor receives the reflective light signals. In step S903, characteristics of current reflective light signals can be obtained by analyzing the reflective light signals. The characteristics of current reflective light signals are used to render a line of gravity that is referred to for calculating a distance between the autonomous robot and an object reflecting the transverse linear lights. It should be noted that the object can be an obstacle such as a wall in front of the autonomous robot.

According to the lines of gravity that are continuously rendered from the received reflective lights, the process running in the autonomous robot determines whether or not any abnormal event has occurred, such as in step S905. If no abnormal event occurs, the step S905 is repeated. Otherwise, if any abnormal event is determined to have occurred from the characteristics of current reflective light signals, such as in step S907, characteristics of previous reflective light signals stored in the memory of the autonomous robot are retrieved. It should be noted that the characteristics of the current or previous reflective light signals are represented by the line of the gravity, including one or more centers of gravity, that is calculated based on the one or more transverse reflective lights.

Figure 6A:
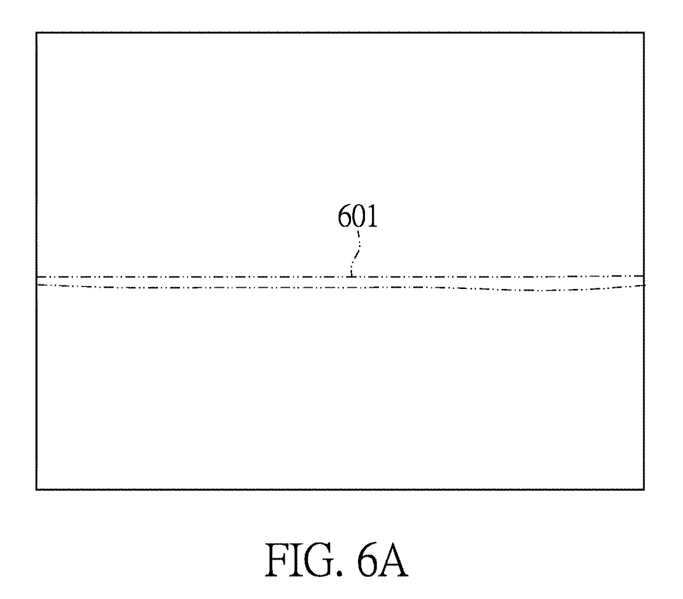
FIG. 6A and FIG. 6B are schematic diagrams showing previous and current reflective light images generated by an autonomous robot according to one embodiment of the disclosure.
Figure 6B:
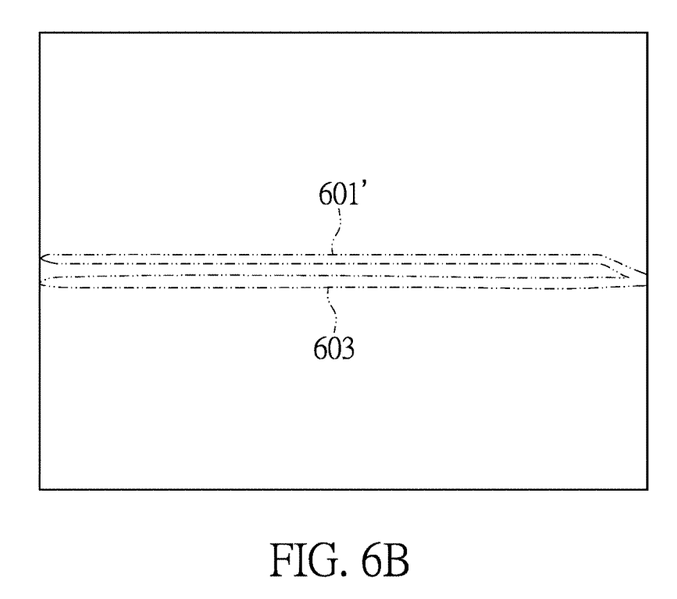

For example, one of the abnormal events may indicate that two or more reflective lights are sensed at the same time. Reference is made to FIG. 6B, which is a schematic diagram of an image that shows two reflective lights. In FIG. 6B, the image includes a first reflective light image 601' and a second reflective light image 603. When this abnormal event occurs, a confidence level value for any determination is low, and the previous reflective light image 601 shown in FIG. 6A is referred to. It should be noted that the previous reflective light image 601 is a previous frame image of a video, and the previous reflective light image 601 remains to be the correct information of the line of gravity as compared with the current reflective light image.

Afterwards, such as in step S909, the characteristics of current reflective light signals can be corrected based on the characteristics of previous reflective light signals. Referring to FIG. 6B, after comparing the current image and the previous image, the second reflective light image 603 shown in FIG. 6B can be corrected, which is the erroneous image that may be reflected by the highly reflective surface where the autonomous robot approaches.

Therefore, the erroneous information can be excluded based on this correction. Afterwards, such as in step S911, the corrected characteristics of the current reflective light signals can be used to confirm the distance to be calculated or any object to be detected.

Figure 10:
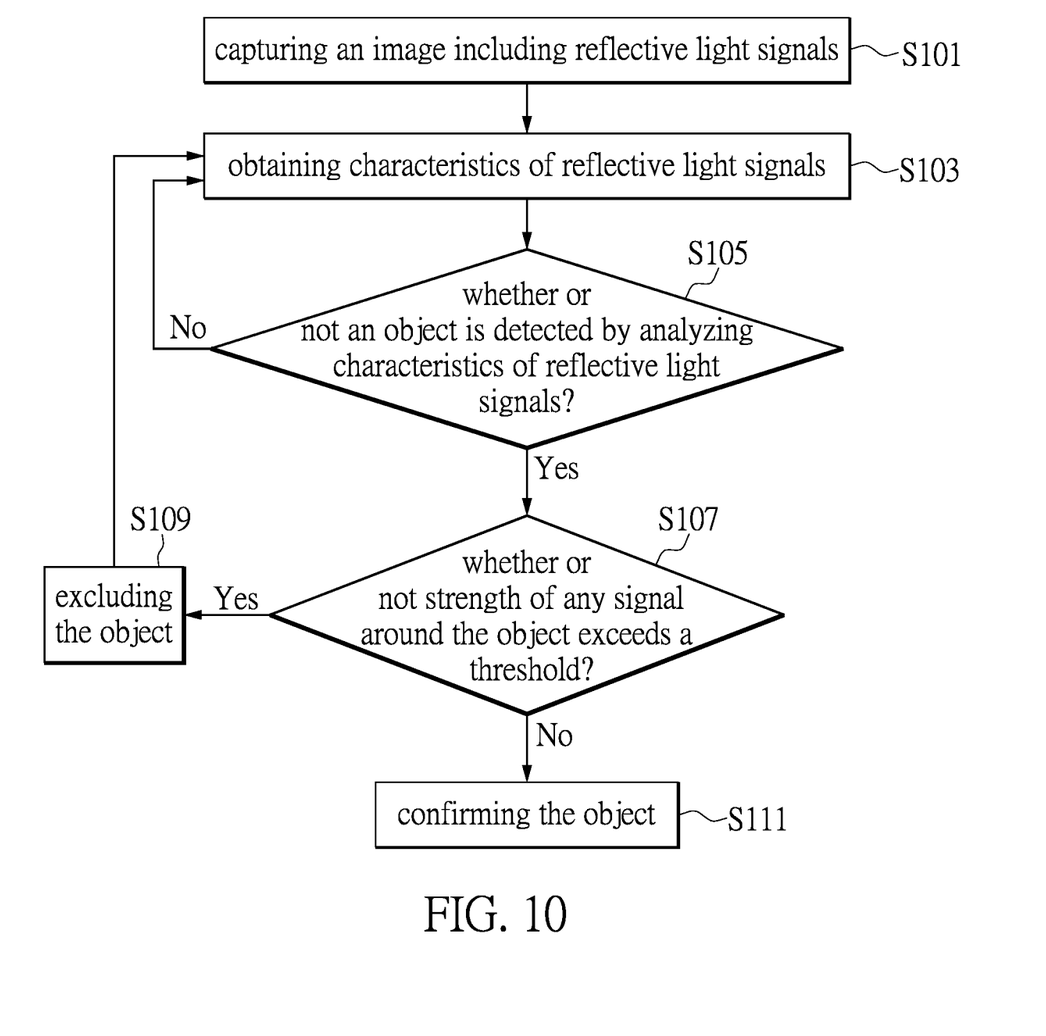
FIG. 10 shows a flow chart further describing the method for eliminating misjudgment of the reflective light according to one further embodiment of the disclosure.

According to one further embodiment of the disclosure, reference is made to FIG. 10, which shows one further flow chart describing the method for eliminating misjudgment of reflective light.

In step S101, the light sensor of the autonomous robot captures an image including reflective light signals when the autonomous robot is in operation. In step S103, the characteristics of reflective light signals can be obtained by analyzing the received reflective light signals. The process running in the autonomous robot then determines whether or not an object is detected by analyzing the characteristics of reflective light signals, such as in step S103. If there is no object to be detected, the step S105 is repeated. If any object is detected according to the characteristics of the reflective light signals, such as in step S107, the method further determines whether or not a strength, which can be used to evaluate the confidence level value, of any light signal around the object exceeds a threshold.

Figure 7:
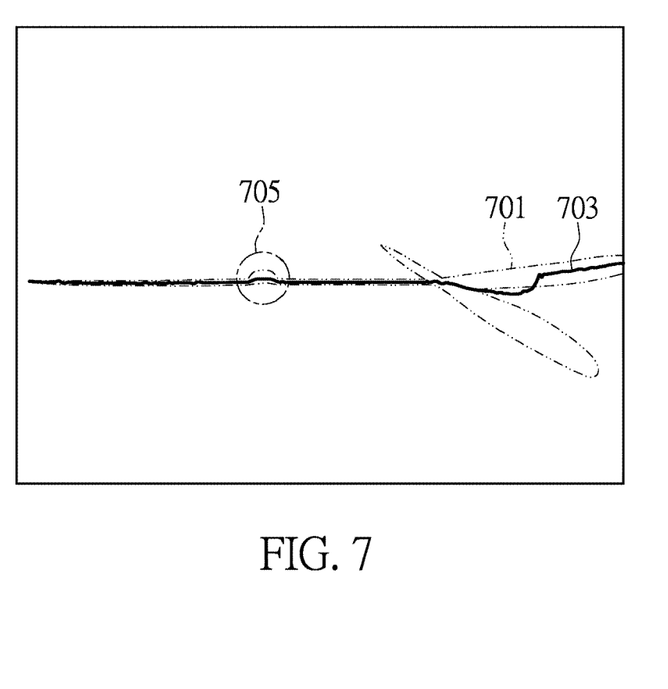
FIG. 7 is a schematic diagram showing a reflective light image and a line of gravity that shows an object to be detected by an autonomous robot in one embodiment of the disclosure.

Reference is made to FIG. 7. This diagram shows a reflective light image 701 and a line of gravity 703 that is rendered according to the reflective light signals. Over the line of gravity 703, a protruding curve at a specific position of the transverse curve is found as a detected object 705.

The method goes on calculating strengths of the transverse reflective lights, and excluding the transverse reflective light with a strength higher than a threshold. According to the embodiment shown in the flow chart, if the strength of signals around the object exceeds the threshold, this object is excluded, such as in step S109. As mentioned above, the strength calculated from the transverse reflective lights can be used to evaluate the confidence level value. Since the confidence level value of determination of the object is low, the process proceeds to step S103. Otherwise, if the strength of signals around the object does not exceed the threshold, the presence of the object can be confirmed, such as in step S111.

Figure 8:
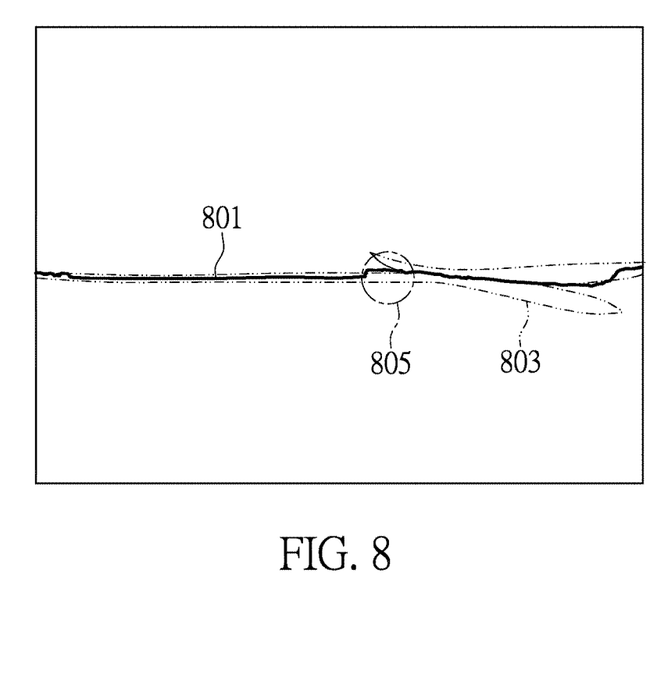
FIG. 8 is another schematic diagram showing a reflective light image and a line of gravity that shows no object to be detected in another embodiment of the disclosure.

Reference is made to FIG. 8, which shows another schematic diagram in which a reflective light image 801 and a line of gravity 803 are shown. Similarly, a protruding curve over the transverse curve is found as a suspected object 805. However, this protruding curve portion is not regarded as indicating an object, since the strength of signals below the suspected object 805 are determined to exceed the threshold. For example, when determining whether or not the strength of any signal exceeds the threshold around the object in the frame image, it is to determine whether or not pixel values of an area at a distance above the protruding curve exceed the threshold.

According to the above embodiments of the method for eliminating misjudgment of reflective light, the misjudgment can be effectively eliminated since the characteristics of the previous reflective light signals retaining more accurate information are referred to. Once the current reflective light signals are corrected, the distance can be correctly calculated, the obstacle can be correctly determined, and a false alarm can be prevented. Furthermore, after being corrected, the characteristics of the current/latest reflective light signals can also be stored in the memory of the autonomous robot as the reference for correcting subsequent signals.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for eliminating misjudgment of a reflective light that is sensed by an optical sensing system which includes a processor, a memory, a light source and a light sensor, wherein the method being performed by the processor comprises steps of:
   capturing, by the light sensor, a frame image including reflective light signals;
   analyzing the reflective light signals for obtaining characteristics of current reflective light signals;
   retrieving characteristics of previous reflective light signals stored in the memory if the characteristics of current reflective light signals are determined to have erroneous information;
   correcting the characteristics of current reflective light signals based on the characteristics of previous reflective light signals in order to exclude the erroneous information; and
   detecting an object that reflects a detection light emitted by the light source, and forms the reflective light signals according to a corrected characteristics of current reflective light signals, so as to eliminate misjudgment caused by the erroneous information,
   wherein the detection light emitted by the light source is a transverse linear light and the reflective light signals sensed by the light sensor form one or more transverse reflective lights, the characteristics of the current or previous reflective light signals are represented by a line of gravity or one or more centers of gravity that is calculated based on the one or more transverse reflective lights, and
   wherein, when the current reflective light signals included in the frame image are determined to have two or more lines of gravity or centers of gravity that are defined as the erroneous information, the previous line of gravity or center of gravity stored in the memory is referred to for determining a current line of gravity or center of gravity that is configured to be stored in the memory, and is provided for the optical sensing system to calculate a distance from the object.

2. The method according to claim 1, further comprising a step of calculating strengths of the transverse reflective lights, and excluding the transverse reflective light having a strength lower than a threshold.

3. The method according to claim 1, wherein the line of gravity or center of gravity regarded as the erroneous information in the characteristics of current reflective light signals is formed by an unexpected reflective light from a ground.

4. The method according to claim 1, wherein the optical sensing system is installed in an autonomous robot and the light source emits the detection light forward to detect the object in front of the autonomous robot.

5. A method for eliminating misjudgment of a reflective light that is sensed by an optical sensing system which includes a processor, a memory, a light source and a light sensor, wherein the method being performed by the processor comprises steps of:
   capturing, by the light sensor, a frame image including reflective light signals;
   analyzing the reflective light signals for obtaining characteristics of reflective light signals;
   detecting an object according to the characteristics of reflective light signals;
   determining whether or not a strength of any light signal around the object exceeds a threshold in the frame image; and
   confirming the presence of the object that reflects a detection light emitted by the light source and forms the reflective light signals if the strength of the light signals around the object does not exceed the threshold; otherwise, the object is excluded if the strength of the light signals around the object exceeds the threshold, so as to eliminate misjudgment caused by an abnormal reflection from the object,
   wherein the detection light emitted by the light source is a transverse linear light and the reflective light signals sensed by the light sensor form one or more transverse reflective lights, the characteristics of the reflective light signals are represented by a line of gravity or one or more centers of gravity that is calculated based on the one or more transverse reflective lights, and
   wherein, when the reflective light signals included in the frame image are determined to have two or more lines of gravity or centers of gravity that are defined as the erroneous information, the previous line of gravity or center of gravity stored in the memory is referred to for determining a current line of gravity or center of gravity that is configured to be stored in the memory, and is provided for the optical sensing system to calculate a distance from the object.

6. The method according to claim 5, wherein the line of gravity or center of gravity indicates a transverse curve along the transverse reflective lights, and the object being detected forms a protruding curve at a specific position of the transverse curve.

7. The method according to claim 6, wherein the step of determining whether or not the strength of any signal exceeds the threshold around the object in the frame image determines whether or not pixel values of an area at a distance above the protruding curve exceed the threshold.

8. The method according to claim 7, wherein the area having the pixel values that exceed the threshold above the protruding curve is formed by an unexpected reflective light from a wall.

9. The method according to claim 8, wherein the optical sensing system is installed in an autonomous robot, and the light source emits the detection light forward to detect the object in front of the autonomous robot.

10. An optical sensing system, comprising:
   a processor, a memory, a light source and a light sensor, wherein the light source emits a transverse linear light as a detection light, and the light sensor senses reflective light signals that form one or more transverse reflective lights from an object that reflects the detection light;
   wherein the processor performs a method for eliminating misjudgment of a reflective light comprising:
   capturing, by the light sensor, a frame image including reflective light signals;
   analyzing the reflective light signals for obtaining characteristics of current reflective light signals;
   retrieving characteristics of previous reflective light signals stored in the memory if the characteristics of current reflective light signals are determined to have erroneous information;
   correcting the characteristics of current reflective light signals based on the characteristics of previous reflective light signals in order to exclude the erroneous information; and
   detecting the object that reflects the detection light emitted by the light source, and forms the reflective light signals according to a corrected characteristics of current reflective light signals, so as to eliminate misjudgment caused by the erroneous information, wherein, in the method for eliminating misjudgment of the reflective light, the characteristics of the current or previous reflective light signals are represented by a line of gravity or one or more centers of gravity that is calculated based on the one or more transverse reflective lights, and
   wherein, if the current reflective light signals included in the frame image are determined to have two or more lines of gravity or centers of gravity that are defined as the erroneous information, the previous line of gravity or center of gravity stored in the memory is referred to for determining a current line of gravity or center of gravity that is configured to be stored in the memory, and is provided for the optical sensing system to calculate a distance from the object.

11. The system according to claim 10, wherein the optical sensing system is installed in an autonomous robot and the light source emits the detection light forward to detect the object in front of the autonomous robot.

* * * * *